(12) United States Patent
Martin et al.

(10) Patent No.: US 12,379,281 B2
(45) Date of Patent: Aug. 5, 2025

(54) COMPUTER-IMPLEMENTED METHOD, DEVICE, COMPUTER PROGRAM, AND COMPUTER-READABLE MEDIUM FOR IDENTIFYING A GEARWHEEL THAT INDUCES VIBRATIONS IN A TRANSMISSION

(71) Applicant: ZF Friedrichshafen AG, Friedrichshafen (DE)

(72) Inventors: Tobias Martin, Gray Court, SC (US); Dorian Srelz, Gray Court, SC (US)

(73) Assignee: ZF Friedrichshafen AG, Friedrichshafen (DE)

( * ) Notice: Subject to any disclaimer, the term of this patent is extended or adjusted under 35 U.S.C. 154(b) by 255 days.

(21) Appl. No.: 17/885,729

(22) Filed: Aug. 11, 2022

(65) Prior Publication Data
US 2023/0046284 A1    Feb. 16, 2023

(30) Foreign Application Priority Data
Aug. 12, 2021   (DE) .......................... 102021208836.8

(51) Int. Cl.
*G01M 13/021*    (2019.01)
*G01H 1/00*      (2006.01)
*G01M 13/028*    (2019.01)
*F16H 61/00*     (2006.01)

(52) U.S. Cl.
CPC .......... *G01M 13/021* (2013.01); *G01H 1/003* (2013.01); *G01M 13/028* (2013.01); *F16H 2061/0068* (2013.01); *F16H 2061/0071* (2013.01)

(58) Field of Classification Search
CPC .. G01M 13/02; G01M 13/021; G01M 13/028; G01H 1/003; F16H 2061/0068; F16H 2061/0071
See application file for complete search history.

(56) References Cited

U.S. PATENT DOCUMENTS

2012/0067138 A1*   3/2012   Klein-Hitpass ......... F03D 17/00
                                                          73/862.31

FOREIGN PATENT DOCUMENTS

| CN | 113063589     | * | 7/2021  | .......... G06M 13/021 |
| CN | 113063589 A   |   | 7/2021  |                        |
| DE | 102005042278 A1 |   | 11/2006 |                      |

OTHER PUBLICATIONS

German Search Report DE 10 2021 208 836.8, dated May 24, 2022. (12 pages).

* cited by examiner

*Primary Examiner* — Benjamin R Schmitt
(74) *Attorney, Agent, or Firm* — Dority & Manning, P.A.

(57) ABSTRACT

A computer-implemented method for identifying a gearwheel (5) that induces vibrations in a transmission includes training a generic AI model with a training data set of a group of reference gearwheels (19). At least one reference profile of a surface (21) of the reference gearwheel (19) and a gearwheel category are provided for each reference gearwheel (19) of the group. The method also includes determining a profile of a surface (11) of a gearwheel (5) and assigning one of the gearwheel categories to the gearwheel (5) on the basis of the determined profile by the trained AI model.

15 Claims, 4 Drawing Sheets

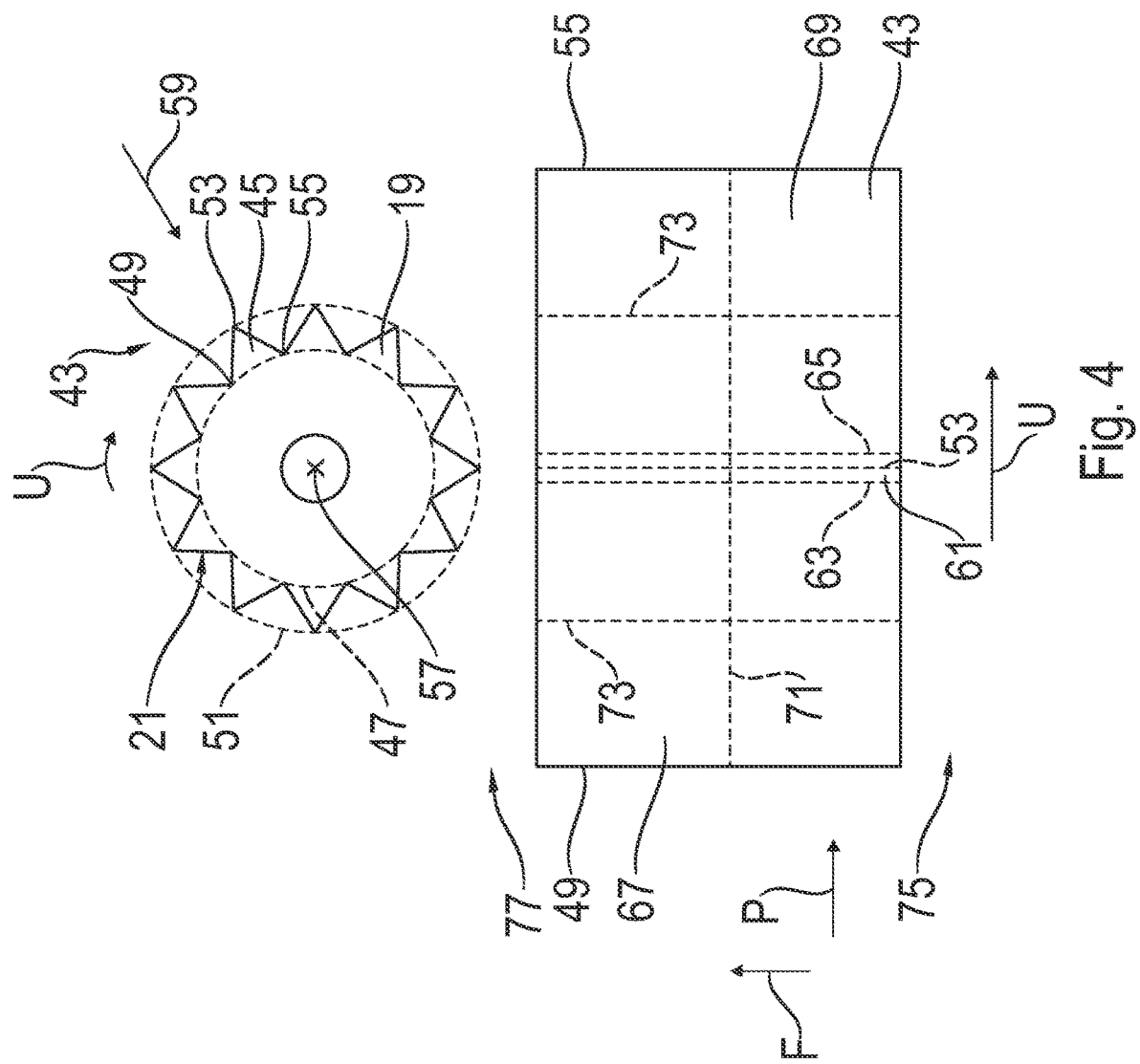

COMPUTER-IMPLEMENTED METHOD, DEVICE, COMPUTER PROGRAM, AND COMPUTER-READABLE MEDIUM FOR IDENTIFYING A GEARWHEEL THAT INDUCES VIBRATIONS IN A TRANSMISSION

CROSS-REFERENCE TO RELATED APPLICATION

The present application is related and claims priority to 102021208836.8 filed in the German Patent Office on Aug. 12, 2021, which is incorporated by reference in its entirety for all purposes.

FIELD OF THE INVENTION

The present invention relates generally to a computer-implemented method, a device, a computer program, and a computer-readable medium for identifying a gearwheel that induces vibrations in a transmission.

BACKGROUND

Methods for identifying a gearwheel that induces vibrations in a transmission are known from the prior art. Transmissions, in particular gear transmissions, are usually manufactured such that the transmissions are composed of their gearwheels and further components of the transmissions. The manufactured transmissions are then frequently inspected in an end-of-line test step. In this test step, the operation of a transmission can be simulated by a test stand by bringing the transmission into states that are typical for the operation. In the different states, the vibrations induced by the components of the transmission can then be measured and evaluated.

If the measured vibrations of a transmission are equal to a threshold value or are above this threshold value, this transmission cannot be released for utilization and can also be designated as a faulty transmission.

In general, it is desirable to minimize the average manufacturing times of transmissions and to minimize the time required to perform fault analyses of transmissions.

SUMMARY OF THE INVENTION

Example aspects of the present invention reduce or minimize the average manufacturing times of transmissions and reduce or minimize the time required to perform fault analyses of transmissions.

According to a first example aspect of the invention, a computer-implemented method includes identifying a gearwheel that induces vibrations in a transmission. The method includes training a generic AI model with the aid of a training data set of a group of reference gearwheels. At least one reference profile of the surface of the reference gearwheel and one gearwheel category are provided for each reference gearwheel of the group. A first gearwheel category of the gearwheel categories is assigned to each reference gearwheel of the group that induces a vibration in the transmission that is equal to a vibration threshold or above the vibration threshold. A second gearwheel category of the gearwheel categories is assigned to each reference gearwheel that induces a vibration in the transmission that is below the vibration threshold. The trained AI model can assign one gearwheel category of the gearwheel categories to each gearwheel. The method also includes determining a profile of a surface of a gearwheel. The method also includes assigning one of the gearwheel categories to the gearwheel on the basis of the determined profile by the trained AI model.

The method is provided for identifying a gearwheel that induces vibrations in a transmission. In particular, the method is suitable for identifying a gearwheel that induces a vibration in the transmission that is equal to a vibration threshold or above the vibration threshold. Preferably, the vibration threshold is a threshold value at which the transmission cannot be released for utilization. In particular, the method is provided for identifying those gearwheels from a group of gearwheels, which induce a vibration in the transmission for which these are intended, that is equal to or above the vibration threshold. The method is provided for identifying a gearwheel, which can be, for example, a spur gear or a bevel gear. The method is also usable for other types of gearwheels.

The method includes training the generic AI model with the aid of the training data set of the group of reference gearwheels. The generic AI model can also be referred to as a generic artificial intelligence model. The AI model can be based, for example, on approaches of machine learning. For example, the AI model can be based on approaches of deep learning by utilizing neural networks. Preferably, the AI model is based on one of the following classifiers: the naive Bayes classifier; a classifier based on logistic regression; a linear support-vector machine (SVM); a non-linear SVM; a classifier based on a neural network; a classifier based on an artificial neural network; a classifier based on a decision tree; or a classifier based on a random forest. Series of tests have shown that the AI model, when this is based on the classifier that is based on the neural network, can particularly precisely predict which gearwheel in the transmission induces a vibration that is equal to or above the vibration threshold. In addition, these series of tests have shown that the AI model, when this is based on the classifier that is based on the random forest, can also highly precisely predict which gearwheel in the transmission induces a vibration that is equal to or above the vibration threshold.

At least one reference profile of the surface of the reference gearwheel and one gearwheel category are provided for each reference gearwheel of the group. In particular, the training data set for each reference gearwheel of the group includes the at least one reference profile of the surface of the reference gearwheel and the gearwheel category. For example, precisely one reference profile of the surface of the reference gearwheel is provided for each reference gearwheel of the group. Alternatively, two reference profiles of the surface of the reference gearwheel can be provided for each reference gearwheel. When two reference profiles of the surface of the reference gearwheel are provided for each reference gearwheel, it is preferred that the two reference profiles are the profiles of a tooth of the reference gearwheel. For example, four, six, eight, or ten reference profiles of the surface of the reference gearwheel can also be provided for each reference gearwheel. In these cases, it is preferably provided that two reference profiles in each case are the profiles of a tooth of the reference gearwheel. For the case in which eight reference profiles are provided, preferably two reference profiles are the profiles of a first tooth, two further reference profiles are the profiles of a second tooth, two further reference profiles are the profiles of a third tooth, and, finally, the last two reference profiles are the profiles of a fourth tooth.

The first gearwheel category of the gearwheel categories is assigned to each reference gearwheel of the group that induces a vibration in the transmission that is equal to or above the vibration threshold. The second gearwheel category of the gearwheel categories is assigned to each reference gearwheel that induces a vibration in the transmission that is below the vibration threshold. Preferably, the vibration threshold is a threshold value at which the transmission cannot be released for utilization. Therefore, either the first gearwheel category or the second gearwheel category is assigned to each reference gearwheel. The reference gearwheels are classified into two categories with the aid of the first and the second gearwheel categories. With the aid of the first and the second gearwheel categories, each gearwheel that is evaluated on the basis of its profile with the aid of the trained AI model can also be classified into one of the two categories. Each reference gearwheel that is assigned to the first gearwheel category can also be designated as a faulty reference gearwheel. Each reference gearwheel that is assigned to the second gearwheel category can also be designated as a faultless reference gearwheel. Each reference gearwheel that induces a vibration in the transmission that is below the vibration threshold is also assigned to the second gearwheel category for the case in which this reference gearwheel does not induce a vibration in the transmission. Each gearwheel category can also be referred to as a gearwheel class.

Preferably, the first gearwheel category includes subcategories. For example, the first gearwheel category includes a first subcategory and a second subcategory. Each subcategory of the subcategories can be assigned to a specific fault of the reference gearwheel. For example, the first subcategory can be assigned to each reference gearwheel, the roughness of which is above a roughness threshold. For example, the second subcategory can be assigned to each reference gearwheel, the waviness of which is above a waviness threshold. Further subcategories can be assigned to each reference gearwheel, the surface of which has a certain defect. For example, a third subcategory can be provided, which is assigned to each reference gearwheel, the surface of which is damaged due to a grinding wheel fracture. With the aid of the subcategories, at least one fault class of different fault classes can be assigned to each reference gearwheel, wherein each subcategory corresponds to a fault class. Preferably, at least one subcategory can be assigned to each reference gearwheel for the case in which the first gearwheel category is assigned to the appropriate reference gearwheel. Preferably, the training data set for each reference gearwheel includes the at least one reference profile, one of the two gearwheel categories, and, if necessary, one or multiple subcategory/subcategories.

The trained AI model can assign one gearwheel category of the gearwheel categories to each gearwheel. In particular, the trained AI model can assign one gearwheel category of the gearwheel categories to each gearwheel that is not a reference gearwheel. Due to the fact that the trained AI model can assign one gearwheel category to each gearwheel, the trained AI model can classify each gearwheel into one of the two categories. Each gearwheel that is assigned to the first gearwheel category can also be designated as a faulty gearwheel. Each gearwheel that is assigned to the second gearwheel category can also be designated as a faulty gearwheel. Preferably, the type of the gearwheel corresponds to the type of the reference gearwheels. For example, for the case in which the gearwheel is a spur gear, the reference gearwheels are spur gears. Alternatively, for the case in which the gearwheel is a bevel gear, it is preferred that the reference gearwheels are bevel gears. In particular, it is preferred that the gearwheel and the reference gearwheels are identical.

The method also includes determining the profile of the surface of the gearwheel. The profile of the surface of the gearwheel can be determined by measuring the profile of the surface of the gearwheel. Alternatively, the profile of the surface of the gearwheel can be determined by importing in the profile of the surface. For example, the profile can be stored in electronic form in a data memory and can be imported from the data memory by a processor. Alternatively, the profile can be present as a print-out on paper. The printed-out profile can be optically detected by a scanning device. The optically detected profile can be stored in a data memory and subsequently imported by the processor. In particular, it is provided that at least one profile of the surface of the gearwheel is determined. For example, two or more profiles of the surface of the gearwheel can be determined. In particular, the number of determined profiles of the surface of the gearwheel corresponds to the number of reference profiles of each reference gearwheel. Preferably, for each gearwheel, the profile or the profiles is/are measured similarly to the reference profile or the reference profiles. When multiple profiles of the surface of the gearwheel are determined, these profiles can be assigned to different teeth of the gearwheel. For example, two, four, six, eight, or ten profiles of the surface of the gearwheel can be provided. In these cases, it is preferably provided that two profiles in each case are the profiles of the same tooth of the gearwheel. For example, for the case in which two profiles of the surface of the gearwheel are provided, it is preferred that the two profiles are the profiles of the same tooth of the gearwheel. For the exemplary case in which eight profiles are provided, preferably two profiles are the profiles of a first tooth of the gearwheel, two further profiles are the profiles of a second tooth of the gearwheel, two more further profiles are the profiles of a third tooth of the gearwheel, and, finally, the last two profiles are the profiles of a fourth tooth of the gearwheel.

The method also includes assigning one of the gearwheel categories to the gearwheel on the basis of the determined profile by trained AI model. In particular, it is provided, for the case in which multiple profiles of the gearwheel are determined, that one of the gearwheel categories is assigned to the gearwheel by the trained AI model on the basis of the multiple determined profiles. One gearwheel category of the gearwheel categories is assigned to the gearwheel by the trained AI model on the basis of the determined profile or the determined profiles. Whether the gearwheel is faultless can be concluded on the basis of the gearwheel category assigned to the gearwheel. In particular for the case in which the first gearwheel category is assigned to the gearwheel, it can be concluded that the gearwheel will induce a vibration in the transmission that is equal to a vibration threshold or above the vibration threshold when the gearwheel is installed in the transmission. Likewise for the case in which the second gearwheel category is assigned to the gearwheel, it can be concluded that the gearwheel will induce a vibration in the transmission that is below the vibration threshold when the gearwheel is installed in the transmission.

Preferably, the AI model applies an evaluation function to the determined profile or to the determined profiles of the gearwheel and applies a decision function to the result of the evaluation function in order to determine which gearwheel category is assigned to the gearwheel. For example, the determined profile or each determined profile of the gearwheel includes an interpolation of four hundred and eighty (480) measuring points. The evaluation function can be a measure for a deviation of the four hundred and eighty (480) measuring points from a mean value of the four hundred and eighty (480) measuring points or a measure for a deviation of the interpolation at predefined points along the interpolation from a mean value of the interpolation at the predefined points. A measure can be, for example, the sampling variance. The decision function can define a critical value, wherein a decision is made on the basis of the critical value that the profile of the gearwheel is a suitable profile when the measure for the deviation is less than the critical value, and a decision is made on the basis of the critical value that the profile of the gearwheel is not a suitable profile when the measure for the deviation is equal to the critical value or is greater than the critical value. When the measure for the deviation is equal to the critical value or is greater than the critical value, the first gearwheel category is assigned to the gearwheel. When the measure for the deviation is less than the critical value, the second gearwheel category is assigned to the gearwheel. In this connection, the AI model assumes that a theoretically optimal critical value for the sampling variance exists, and so the profile of the gearwheel is a suitable profile when the measure for the deviation is less than the theoretically optimal critical value, and the profile of the gearwheel is not a suitable profile when the measure for the deviation is equal to the theoretically optimal critical value or is greater than the theoretically optimal critical value. By increasing the number of reference gearwheels for the training data set, this theoretically optimal critical value can always be more precisely determined and approximated by the critical value. It is further preferred when a fault parameter can be provided in order to take a fault tolerance into account. The measure for the deviation and the negative fault parameter can be added and a decision can be made that the profile of the gearwheel is a suitable profile when this sum is less than the critical value, and that the profile of the gearwheel is not a suitable profile when this sum is equal to the critical value or is greater than the critical value. As the number of reference gearwheels increases, the statistical reliability of the AI model can be improved and the absolute value of the fault parameter can be reduced.

Since the generic AI model is trained with the aid of a training data set that includes reference profiles and gearwheel categories, and the trained AI model assigns a gearwheel category to the gearwheel on the basis of the determined profile of the gearwheel, the present method goes beyond the test methods known from the prior art for testing gearwheels, in which the gearwheels are measured, for example, geometrically, and measured actual values are compared with predefined target values, and a gearwheel is found to be faultless for the case in which the actual values correspond to the target values within predefined tolerances, and a gearwheel is found to be faulty for the case in which the actual values deviate from the target values to a greater extent than the predefined tolerances. Series of experiments with the trained AI model have yielded the surprising result that, with the aid of the assignment of the gearwheel category to the gearwheel by the trained AI model, substantially more reliable conclusions can be drawn regarding the state of the gearwheel than is the case with the test methods of gearwheels known from the prior art. In particular, gearwheels could be reliably identified with the aid of the trained AI model that induce a vibration in the transmission that is equal to a vibration threshold or above the vibration threshold before these gearwheels were installed in the transmission. The reliable identification of such gearwheels reduces the average manufacturing time of transmissions, since the probability of a vibration induced by a gearwheel that is equal to or above the vibration threshold can be considerably reduced since the gearwheels identified as faulty are not installed in the transmission and, therefore, the number of transmissions in a group having a fixed number of transmissions, that are not themselves faulty due to a faulty gearwheel, can be increased. In addition, the reliable identification of faulty gearwheels ensures that fault analyses of transmissions induced by faulty gearwheels can be avoided or at least the frequency of their occurrence can be considerably reduced.

In other words, with the aid of the method according to example aspects of the invention, each gearwheel can be classified into a first class or a second class and, due to this classification, it can be concluded that the gearwheel is either faulty, namely for the case in which the gearwheel was classified into the first class, or is faultless, namely for the case in which the gearwheel was classified into the second class. This conclusion is reached by the AI model and makes it possible to identify the gearwheels that, due to their determined profile, would likely cause a transmission fault in the transmission. The gearwheels identified in this way can therefore be sorted out before these are installed in the transmission. This results in a reduced average production time of transmissions and a reduction of the number of necessary fault analyses of transmissions. In addition, the method results in the acceleration of fault analyses of transmissions since focus can be placed on faults in the fault analysis that are not caused by gearwheels.

In summary, it can therefore be established that the average manufacturing time of transmissions and the time required to perform fault analyses of transmissions can be reduced or minimized.

In one example embodiment, the method includes generating the training data set, wherein the generation of the training data set for each reference gearwheel includes: determining a reference profile of the surface of the reference gearwheel; and determining the gearwheel category. Preferably, a reference profile of the surface of the reference gearwheel can be determined for each reference gearwheel by measuring the reference profile. Alternatively, another number of reference profiles can be determined, in particular measured, for each reference gearwheel. For example, two, four, six, or eight reference profiles can be determined, in particular measured, for each reference gearwheel, wherein two of the reference profiles are determined, in particular measured, for each tooth of four teeth of the reference gearwheel. Alternatively, the reference profile for each reference gearwheel can be determined in another way in order to measure the reference profile for each reference gearwheel. For example, the reference profile for each reference gearwheel can be imported. Preferably, the reference profiles are stored in electronic form in a data memory and are imported from this data memory by a processor. In addition, the reference profiles can be present as a print-out on paper. The printed-out reference profiles can be optically detected by a scanning device and the optically detected reference profiles can be stored in electronic form in the data memory. Preferably, the gearwheel category of each reference gearwheel is determined by installing each reference gearwheel in the transmission intended for the reference gearwheel and detecting, in particular by sensors, the vibration induced by the reference gearwheel and comparing the vibration with the vibration threshold. If the detected vibration induced by the reference gearwheel is equal to or above the vibration threshold, the first gearwheel category is assigned to the reference gearwheel. If the detected vibration induced by the reference gearwheel is below the vibration threshold, the second gearwheel category is assigned to the reference gearwheel.

In one example embodiment, the determination of the profile of the surface of the gearwheel includes determining the profile of the surface of the gearwheel along a tooth flank of a tooth of the gearwheel. Preferably, the training data set for each reference gearwheel includes a reference profile of the surface of the reference gearwheel, which was determined along a tooth flank of a tooth of the reference gearwheel if the profile of the surface of the gearwheel is determined along the tooth flank of the tooth of the gearwheel. Series of tests have shown that, as a result, the AI model can particularly precisely predict which gearwheel in the transmission induces a vibration that is equal to or above the vibration threshold.

In one example embodiment, the determination of the profile of the surface of the gearwheel includes determining the profile of the surface of the gearwheel along a path extending essentially perpendicularly to the axis of rotation of the gearwheel. Preferably, the training data set for each reference gearwheel includes a reference profile of the surface of the reference gearwheel, which was determined along a path extending essentially perpendicularly to the axis of rotation of the reference gearwheel if the profile of the surface of the gearwheel extends along the path extending essentially perpendicularly to the axis of rotation of the gearwheel. Series of tests have shown that, as a result, the AI model can particularly precisely predict which gearwheel in the transmission induces a vibration that is equal to or above the vibration threshold.

In one example embodiment, the determination of the profile of the surface of the gearwheel includes determining the profile of the surface of the gearwheel along a path extending essentially parallel to the axis of rotation of the gearwheel. Preferably, the training data set for each reference gearwheel includes a reference profile of the surface of the reference gearwheel, which was determined along a path extending essentially parallel to the axis of rotation of the reference gearwheel if the profile of the surface of the gearwheel extends along the path extending essentially parallel to the axis of rotation of the gearwheel. Series of tests have shown that, as a result, the AI model can particularly precisely predict which gearwheel in the transmission induces a vibration that is equal to or above the vibration threshold.

Even though the method steps are described in a certain order, the present invention is not limited to this order. Rather, the individual method steps can be carried out in any reasonable order, in particular also temporally in parallel to one another, at least partially or in sections.

According to a second example aspect of the invention, a device is provided for identifying a gearwheel that induces vibrations in a transmission, using mechanisms that are adapted for carrying out the steps of the method according to the first example aspect of the invention. Preferably, the device includes a holding fixture for a gearwheel, which engages into the gearwheel and can move this about an axis of rotation of the gearwheel. Preferably, the holding fixture is designed for engaging into each of the reference gearwheels in succession and moving the reference gearwheels about their axis of rotation. The device includes, for example, a sensing device or sensor having a probe. The sensing device is preferably adjustable such that the probe can be brought, with the free end of the probe, into contact with a surface of the gearwheel or with a surface of a reference gearwheel. While the free end of the probe is in contact with the surface, the free end can be preferably moved over the surface of the gearwheel or of the reference gearwheel along a path. Due to the fact that the free end can be brought into contact with the surface and can be moved over the surface along the path, a profile of the surface of the gearwheel or of the reference gearwheel can be measured with the aid of the free end.

Preferably, the device includes a processor, a data memory, and a scanner or scanning device. The device is designed for identifying a gearwheel that induces vibrations in a transmission. The holding fixture, the sensing device, the probe, the processor, the data memory, and the scanning device can also be referred to as mechanisms of the device. The mechanisms are adapted for carrying out the steps of an example embodiment of a computer-implemented method according to example aspects of the invention.

The features, technical effects, and/or advantages described in conjunction with the method according to the first mechanisms aspect of the invention also apply, at least in a similar way, for the device according to the second mechanisms aspect of the invention, and so a repetition in this regard will be dispensed with here.

According to a third mechanisms aspect of the invention, a computer program includes commands that prompt the device according to the second example aspect of the invention to carry out the steps of the method according to the first example aspect of the invention. The computer program can be stored on the data memory of the device according to the second example aspect. The data memory forms an example of a computer-readable medium. The commands of the computer program can be carried out by the processor.

The features, technical effects, and/or advantages described in conjunction with the method according to the first example aspect of the invention and in conjunction with the device according to the second example aspect of the invention also apply, at least in a similar way, for the computer program according to the third example aspect of the invention, and so a repetition in this regard will be dispensed with here.

According to a fourth example aspect of the invention, a computer-readable medium having the computer program according to the third example aspect of the invention is stored on the computer-readable medium. The computer-readable medium can include a data memory, in particular a data memory of the device according to the second example aspect of the invention.

The features, technical effects, and/or advantages described in conjunction with the method according to the first example aspect of the invention, in conjunction with the device according to the second example aspect of the invention, and in conjunction with the computer program according to the third example aspect of the invention also apply, at least in a similar way, for the computer-readable medium according to the fourth example aspect of the invention, and so a repetition in this regard will be dispensed with here.

BRIEF DESCRIPTION OF THE DRAWINGS

Further features, advantages, and possible applications of the present invention result from the following description of the exemplary embodiments and the figures. All described and/or pictorially represented features form, alone and in any combination, the subject matter of the invention also regardless of their composition in the individual claims or their back references. In addition, identical reference characters in the figures stand for identical or similar objects.

FIG. 4 shows a schematic of a reference gearwheel.

DETAILED DESCRIPTION

Figure 1:
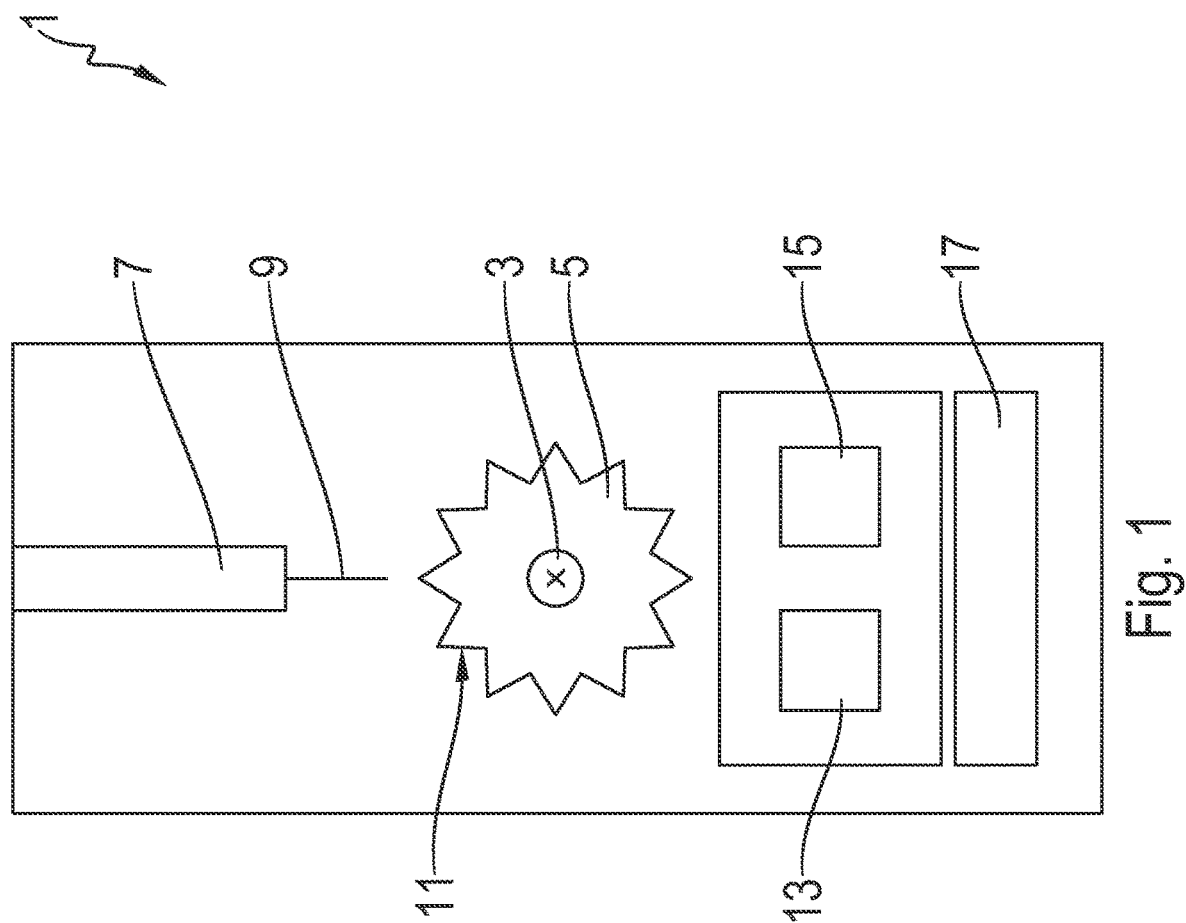
FIG. 1 shows a schematic of one example embodiment of a device according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic of one embodiment of a device 1 according to example aspects of the invention. The device 1 includes a holding fixture 3 for a gearwheel 5, which engages into the gearwheel 5 and can move the gearwheel 5 about an axis of rotation of the gearwheel 5. The axis of rotation is represented as an "X." The device 1 includes a sensing device 7 having a probe 9. The sensing device 7 is adjustable such that the probe 9 can be brought, with the free end of the probe 9, into contact with a surface 11 of the gearwheel 5. While the free end of the probe 9 is in contact with the surface 11, the free end can be moved over the surface 11 along a path. Due to the bringing into contact and moving of the free end over the surface along the path, a profile of the surface 11 of the gearwheel 5 can be measured.

The device 1 also includes a processor 13, a data memory 15, and a scanning device 17. The device 1 is designed for identifying a gearwheel 5 that induces vibrations in a transmission. The holding fixture 3, the sensing device 7, the probe 9, the processor 13, the data memory 15, and the scanning device 17 can also be referred to as mechanisms of the device 1. The mechanisms are adapted for carrying out the steps of an embodiment of a computer-implemented method according to example aspects of the invention. A computer program that includes commands that prompt the device 1 to carry out the steps of the method is stored on the data memory 15. The data memory 15 forms an example of a computer-readable medium. The commands of the computer program can be carried out by the processor 13.

Figure 2:
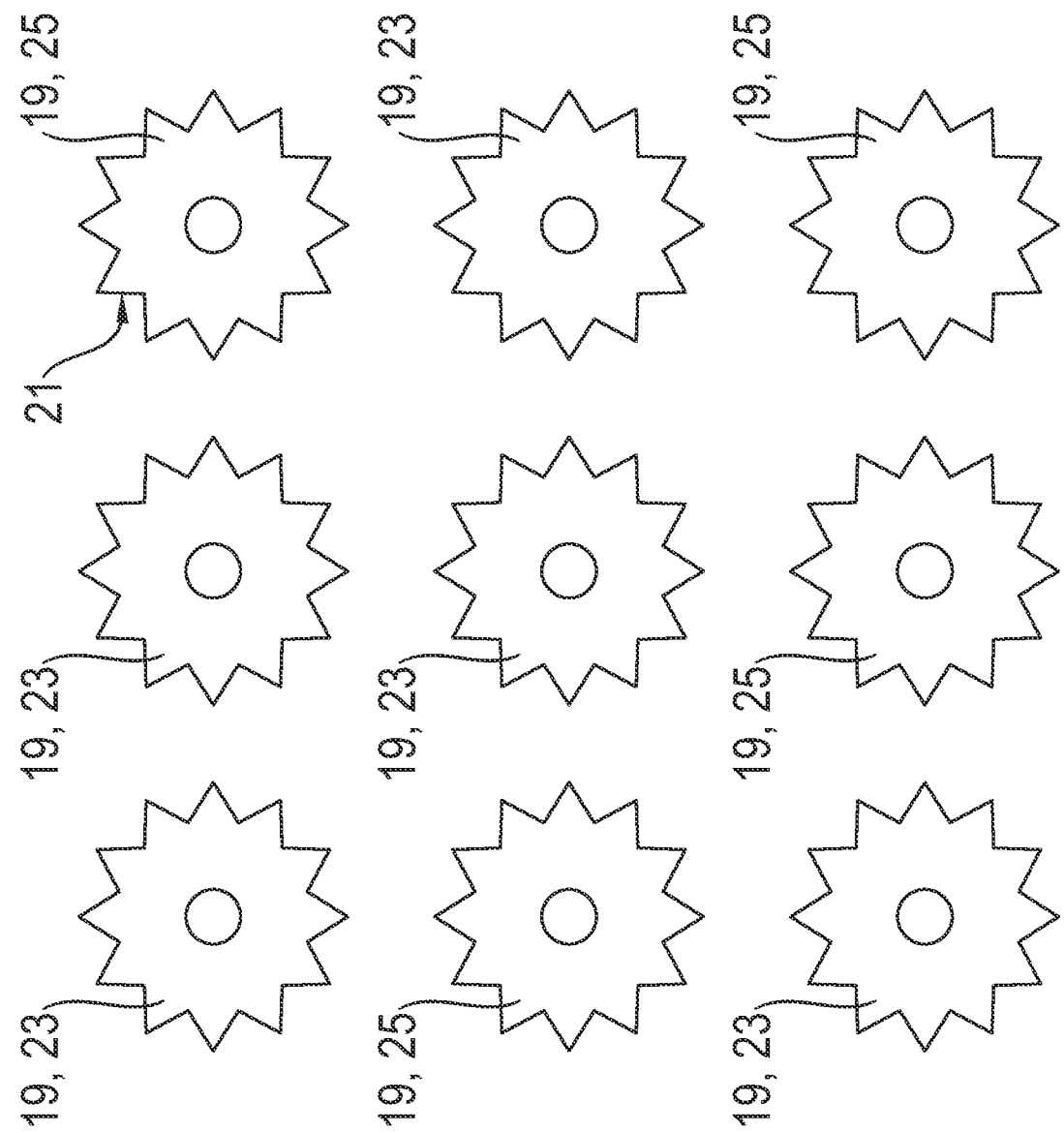
FIG. 2 shows a schematic of a group of reference gearwheels.

FIG. 2 shows a schematic of an exemplary group of reference gearwheels 19. Each reference gearwheel 19 has a surface 21. Either a first gearwheel category 23 or a second gearwheel category 25 is provided for each reference gearwheel 19. The first gearwheel category 23 of the gearwheel categories is assigned to each reference gearwheel 19 of the group that induces a vibration in the transmission that is equal to a vibration threshold or above the vibration threshold. The second gearwheel category 25 of the gearwheel categories is assigned to each reference gearwheel 19 that induces a vibration in the transmission that is below the vibration threshold.

Figure 3:
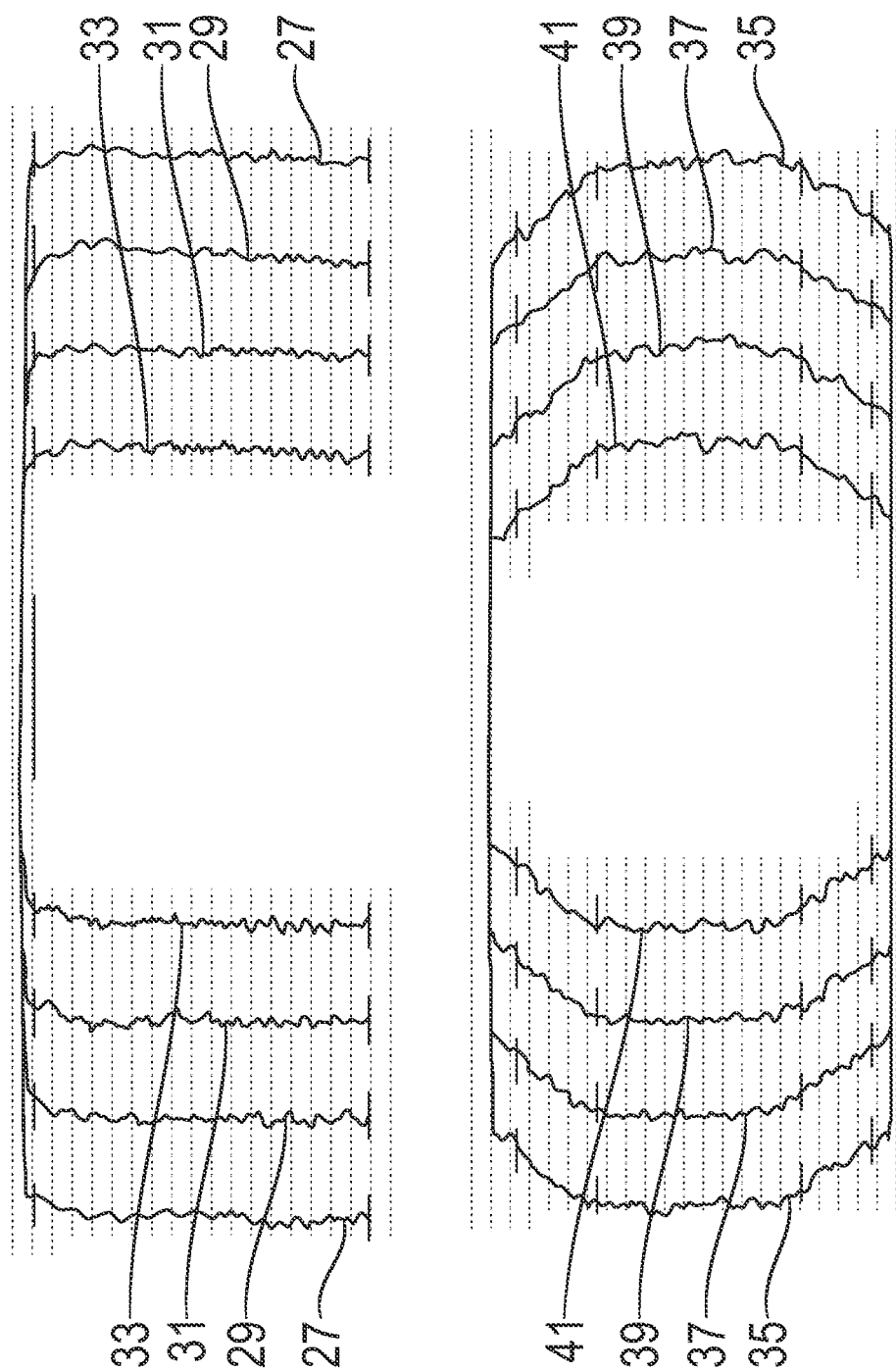
FIG. 3 shows a schematic of eight reference profiles.

FIG. 3 shows a schematic of eight reference profiles of the surfaces 21 of four reference gearwheels 19 of the group of reference gearwheels 19 in FIG. 2. The eight reference profiles have a first reference profile 27, a second reference profile 29, a third reference profile 31, a fourth reference profile 33, a fifth reference profile 35, a sixth reference profile 37, a seventh reference profile 39, and an eighth reference profile 41. The first reference profile 27 and the fifth reference profile 35 are assigned to a first reference gearwheel 19 of the group of reference gearwheels 19, the second reference profile 29 and the sixth reference profile 37 are assigned to a second reference gearwheel 19 of the group of reference gearwheels 19, the third reference profile 31 and the seventh reference profile 39 are assigned to a third reference gearwheel 19 of the group of reference gearwheels 19, and the fourth reference profile 33 and the eighth reference profile 41 are assigned to a fourth reference gearwheel 19 of the group of reference gearwheels 19. The eight reference profiles are represented merely by way of example, and two reference profiles of the surface 21 of the corresponding reference gearwheel 19 are provided for each reference gearwheel 19 of the group of reference gearwheels 19. Alternatively, eight reference profiles of the surface 21 of the corresponding reference gearwheel 19 can also be provided for each reference gearwheel 19 of the group of reference gearwheels 19.

FIG. 4 shows a schematic of the first reference gearwheel 19, of the surface 21 of which the first reference profile 27 represented in FIG. 3 and the fifth reference profile 35 likewise represented in FIG. 3 have been measured. In addition, FIG. 4 shows a section 43 of this surface 21. The section 43 of the surface 21 is formed by a surface of a tooth 45 of the first reference gearwheel 19. The surface of the tooth 45 extends from a first root line 49 defining a root diameter 47 of the first reference gearwheel 19 over a tip line 53 defining a tip circle diameter 51 of the reference gearwheel 19 toward a second root line 55 defining the root diameter 47 of the reference gearwheel 19. The first root line 49, the tip line 53, and the second root line 55 extend in parallel to the axis of rotation 57 of the first reference gearwheel 19. The section 43 is represented in FIG. 4 at the bottom as a top view along a viewing direction 59 represented as an arrow in FIG. 4 at the top. In the area of the tip line 53, the section 43 includes a top land 61 (not represented in FIG. 4 at the top), which extends in the direction of the axis of rotation 57 together with the tip line 53 in parallel to the axis of rotation 57 and in the circumferential direction U along the tip circle diameter 51. The top land 61 extends in the circumferential direction from a first line 63 represented as a dashed line to the left of the tip line 53 to a second line 65 represented as a dashed line to the right of the tip line 53. The top land 61 divides the section 43 into a first surface 67 of a first tooth flank of the tooth 45 and into a second surface 69 of a second tooth flank of the tooth. The first surface 67 extends from the first root line 49 toward the first line 63 and the second surface 69 extends from the second line 65 toward the second root line 55. The section 43 represented in FIG. 4 at the bottom is shown by way of example for the tooth 45 represented in FIG. 4 at the top. Each tooth of the first reference gearwheel 19 has a corresponding section.

As described above, the first reference profile 27 and the fifth reference profile 35 of the surface 21 of the first reference gearwheel 19 are measured. For this purpose, the sensing device 7 was adjusted such that the probe 9 was brought, with its free end, into contact with the section 43 of the surfaces 21 of the first reference gearwheel 19 and, while the free end of the probe 9 was in contact with the section 43, the free end was moved over the section 43 along paths represented in FIG. 4 at the bottom.

The free end of the probe 9 was moved over the section 43 of the tooth 45 along a first path 71 in order to measure the first reference profile 27. The first path 71 extends over the first surface 67 of the first tooth flank, the top land 61, and the second surface 69 of the second tooth flank of the reference gearwheel 19. The first path 71 extends, at least partially or in sections, along the first surface 67 of the first tooth flank from the first root line 49 to the first line 63 and along the second surface 69 of the second tooth flank from the second line 65 to the second root line 55. These extensions of the first path 71 ensure that the first reference profile 27 was measured, at least partially or in sections, in the profile direction P. These extensions of the first path 71 can be designated as an extension extending essentially perpendicularly to the axis of rotation. The first path 71 extends essentially perpendicularly to the axis of rotation of the reference gearwheel 19.

In addition, the free end of the probe 9 was moved along a second path 73 in order to measure the fifth reference profile 35. The second path 73 extends over the first surface 67 of the first tooth flank and the second surface 69 of the second tooth flank of the first reference gearwheel 19. The second path 73 extends, partially or in sections, from a first side 75 of the first reference gearwheel 19 essentially in parallel to the axis of rotation 57 to a second side 77 of the first reference gearwheel 19 situated opposite the first side. These extensions of the second path 73 ensure that the fifth reference profile 35 was measured, at least partially or in sections, in the flank direction F. This extension of the second path 73 can be designed as an extension extending essentially in parallel to the axis of rotation of the first reference gearwheel 19. The fifth path 79 extends essentially in parallel to the axis of rotation of the first reference gearwheel 19.

The features, technical effects, and/or advantages described in conjunction with first reference gearwheel 19 represented in FIG. 4 also apply, at least in a similar way, for all other reference gearwheels 19 of the group of reference gearwheels 19, such as, for example, for the second reference gearwheel 19, the third reference gearwheel 19, and the fourth reference gearwheel 19. In particular, for the second reference gearwheel 19, the third reference gearwheel 19, and the fourth reference gearwheel 19, the second reference profile 29, the third reference profile 31, and the fourth reference profile 33 were measured similarly to the first reference profile 27, and the sixth reference profile 37, the seventh reference profile 39, and the eighth reference profile 41 were measured similarly to the fifth reference profile 35.

The computer-implemented method provides that a training data set is initially generated. The generation of the training data set includes, for each reference gearwheel 19, measuring the two reference profiles of the surface 21 of the reference gearwheel 19. The measurement of two reference profiles for each reference gearwheel 19 is purely by way of example and another number of reference profiles can also be measured for each reference gearwheel 19. For example, eight reference profiles can be measured for each reference gearwheel 19, wherein two of the reference profiles are measured for each tooth of four teeth of the reference gearwheel. Alternatively, the two reference profiles for each reference gearwheel 19 can be determined in another way in order to measure the two reference profiles for each reference gearwheel 19. For example, the reference profiles for each reference gearwheel 19 can be imported. Preferably, the reference profiles are stored in electronic form in a data memory 15 and are imported from this data memory 15 by a processor 13. In addition, the reference profiles can be present as a print-out on paper. The printed-out reference profiles can be optically detected by the scanning device 17 and the optically detected reference profiles can be stored in electronic form in the data memory 15.

The computer-implemented method also provides that a gearwheel category is determined for each reference gearwheel 19. As described above, either the first gearwheel category 23 or the second gearwheel category 25 is provided for each reference gearwheel 19. The first gearwheel category 23 of the gearwheel categories is assigned to each reference gearwheel 19 of the group that induces a vibration in the transmission that is equal to or above the vibration threshold. The second gearwheel category 25 of the gearwheel categories is assigned to each reference gearwheel 19 that induces a vibration in the transmission that is below the vibration threshold. The training data set of the group of reference gearwheels 19 includes, for each reference gearwheel 19 of the group, the at least one reference profile of the surface 21 of the reference gearwheel 19 and a gearwheel category.

As described above, a first gearwheel category 23 and a second gearwheel category 25 are provided. If the first gearwheel category 23 is assigned to a reference gearwheel 19, this reference gearwheel 19 induces a vibration in the transmission that is equal to a vibration threshold or above the vibration threshold. This reference gearwheel 19 can also be referred to as a faulty reference gearwheel 19. The first gearwheel category 23 preferably has further subcategories, such as, for example, a first subcategory and a second subcategory. Each subcategory of the further subcategories can be assigned to a specific fault of the reference gearwheel. For example, the first subcategory can be assigned to each reference gearwheel 19, the roughness of which is above a roughness threshold. For example, the second subcategory can be assigned to each reference gearwheel 19, the waviness of which is above a waviness threshold. Further subcategories can be assigned to each reference gearwheel 19, the surface 21 of which has a certain defect. For example, a third subcategory can be provided, which is assigned to each reference gearwheel 19, the surface 21 of which is damaged due to a grinding wheel fracture. With the aid of the subcategories, different fault classes can be assigned to each reference gearwheel 19, wherein each subcategory corresponds to a fault class. Preferably, at least one subcategory can be assigned to each reference gearwheel 19 for the case in which the first gearwheel category is assigned to the appropriate reference gearwheel 19. If the second gearwheel category 25 is assigned to a reference gearwheel 19, this reference gearwheel 19 induces a vibration in the transmission that is below the vibration threshold. This reference gearwheel 19 can also be referred to as a faultless reference gearwheel 19.

In addition, the computer-implemented method provides that a generic AI model is trained with the aid of the training data set of the group of reference gearwheels 19. As described above, the training data set for each reference gearwheel 19 includes the at least one reference profile, one of the two gearwheel categories, and, if necessary, one or multiple subcategory/subcategories. Each reference gearwheel 19 therefore establishes a connection between at least one appropriate reference profile and an appropriate gearwheel category. The generic AI model is trained on the basis of these connections of the reference gearwheels 19 such that the trained AI model assign one gearwheel category of the gearwheel categories to each gearwheel 5 that is not a reference gearwheel 19.

In addition, the computer-implemented method provides that a first profile and a second profile of a surface 11 of a gearwheel 5 are determined, wherein the gearwheel 5 is a gearwheel 5, with respect to which it is to be checked whether the gearwheel 5 will likely cause vibrations in the transmission for which the gearwheel 5 is intended. In particular, it is provided that at least one profile of the surface 11 of the gearwheel 5 is determined. Preferably, the type of the gearwheel 5 corresponds to the type of the reference gearwheels 19. If the gearwheel 5 is a spur gear, then the reference gearwheels 19 are preferably spur gears. If the gearwheel 5 is a bevel gear, then the reference gearwheels 19 are preferably bevel gears. In particular, it is preferred that the gearwheel 5 and the reference gearwheels 19 are identical. The features, technical effects, and/or advantages described in conjunction with the first reference gearwheel 19 represented in FIG. 4 also apply, at least in a similar way, for the gearwheel 5. In particular, for the gearwheel 5, the first profile is measured similarly to the first reference profile 27 and the second profile is measured similarly to the fifth reference profile 35. The determination of the first profile and the determination of the second profile include a determination of the profile of the surface 11 of the gearwheel 5 along a first tooth flank of a tooth of the gearwheel 5 and along a second tooth flank of the tooth of the gearwheel 5. The first profile is determined, namely, along a path extending essentially perpendicularly to the axis of rotation of the gearwheel 5, which extends on the tooth of the gearwheel 5 similarly to the first path 71 represented in FIG. 4. The second profile is determined along a path extending essentially in parallel to the axis of rotation of the gearwheel 5, which extends on the tooth of the gearwheel 5 similarly to the second path 73 represented in FIG. 4.

One gearwheel category of the gearwheel categories is assigned to the gearwheel 5 by the trained AI model on the basis of the determined first profile and on the basis of the determined second profile. Whether the gearwheel 5 is faultless can be concluded on the basis of the gearwheel category assigned to the gearwheel 5. In particular for the case in which the first gearwheel category 23 is assigned to the gearwheel 5, it can be concluded that the gearwheel 5 will induce a vibration in the transmission that is equal to a vibration threshold or above the vibration threshold when the gearwheel 5 is installed in the transmission. Likewise for the case in which the second gearwheel category 25 is assigned to the gearwheel 5, it can be concluded that the gearwheel 5 will induce a vibration in the transmission that is below the vibration threshold when the gearwheel 5 is installed in the transmission.

Since the generic AI model is trained with the aid of a training data set that includes reference profiles and gearwheel categories, and the trained AI model assigns a gearwheel category to the gearwheel 5 on the basis of the determined profile, the present method goes beyond the test methods known from the prior art for testing gearwheels, in which the gearwheels are measured, for example, geometrically, and measured actual values are compared with predefined target values, and a gearwheel is found to be faultless for the case in which the actual values correspond to the target values within predefined tolerances, and a gearwheel is found to be faulty for the case in which the actual values deviate from the target values to a greater extent than the predefined tolerances. Series of experiments with the trained AI model have yielded the surprising result that, with the aid of the assignment of the gearwheel category to the gearwheel 5 by the trained AI model, considerably more reliable conclusions are drawn regarding the state of the gearwheel 5 than is the case with the test methods of gearwheels known from the prior art. In particular, gearwheels could be reliably identified with the aid of the trained AI model that induce a vibration in the transmission that is equal to a vibration threshold or above the vibration threshold before these gearwheels were installed in the transmission. The reliable identification of such gearwheels reduces the average manufacturing time of transmissions, since the probability of a vibration induced by a gearwheel that is equal to or above the vibration threshold can be considerably reduced since the gearwheels identified as faulty are not installed in the transmission and, therefore, the number of transmissions in a group having a fixed number of transmissions, that are not themselves faulty due to a faulty gearwheel, can be increased. In addition, the reliable identification of faulty gearwheels ensures that fault analyses of transmissions induced by faulty gearwheels can be avoided or at least the frequency of their occurrence can be considerably reduced.

In addition, it is pointed out that "including" does not rule out other elements or steps and "one" does not rule out a plurality. Moreover, it is pointed out that features that have been described with reference to one of the aforementioned exemplary embodiments can also be utilized in combination with other features of other above-described exemplary embodiments. Reference characters in the claims are not to be considered as a limitation.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 device
3 holding fixture
5 gearwheel
7 sensing device
9 probe
11 surface of a gearwheel
13 processor
15 data memory
17 scanning device
19 reference gearwheel
21 surface of a reference gearwheel
23 first gearwheel category
25 second gearwheel category
27 first reference profile
29 second reference profile
31 third reference profile
33 fourth reference profile
35 fifth reference profile
37 sixth reference profile
39 seventh reference profile
41 eighth reference profile
43 section of the surface of a reference gearwheel
45 tooth of a reference gearwheel
47 root diameter
49 first root line
51 tip circle diameter
53 tip line 55 second root line
57 axis of rotation of a reference gearwheel
59 viewing direction
61 top land
63 first line
65 second line
67 first surface of a first tooth flank
69 second surface of a second tooth flank
71 first path
73 second path
75 first side of the reference gearwheel
77 second side of the reference gearwheel

The invention claimed is:

1. A computer-implemented method for identifying a gearwheel (5) that induces vibrations in a transmission, the method comprising:
    training a generic AI model with a training data set of a group of reference gearwheels (19), at least one reference profile of a surface (21) and a gearwheel category provided for each reference gearwheel (19) of the group, a first gearwheel category (23) of the gearwheel categories assigned to each reference gearwheel (19) of the group that induces a vibration in the transmission that is equal to a vibration threshold or above the vibration threshold, a second gearwheel category (25) of the gearwheel categories assigned to each reference gearwheel (19) that induces a vibration in the transmission that is below the vibration threshold;
    determining a profile of a surface (11) of a gearwheel (5); and
    assigning, by the trained AI model, one of the gearwheel categories to the gearwheel (5) based on the determined profile.

2. The method of claim 1, further comprising generating the training data set, wherein generating the training data set for each reference gearwheel (19) comprises determining the at least one reference profile of the surface (21) of the reference gearwheel (19) and determining the gearwheel category.

3. The method of claim 2, wherein the at least one reference profile of the surface (21) of the reference gearwheel (19) comprises at least two reference profiles of a same tooth of the gearwheel, the gearwheel category for the reference gearwheel (19) being determined based on the at least two reference profiles.

4. The method of claim 2, wherein the at least one reference profile of the surface (21) of the reference gearwheel (19) comprises two first profiles of each of a given number of teeth of the gearwheel, the gearwheel category for the reference gearwheel (19) being determined based on the two first profiles of each of the given number of teeth of the gearwheel.

5. The method of claim 1, wherein determining the profile of the surface (11) of a gearwheel (5) comprises determining the profile of the surface (11) of the gearwheel (5) along a tooth flank of a tooth of the gearwheel (5).

6. The method of claim 1, wherein determining the profile of the surface (11) of a gearwheel (5) comprises determining the profile of the surface (11) of the gearwheel (5) along a path extending essentially perpendicularly to an axis of rotation of the gearwheel (5).

7. The method of claim 1, wherein determining the profile of the surface (11) of a gearwheel (5) comprises determining the profile of the surface (11) of the gearwheel (5) along a path extending essentially parallel to an axis of rotation of the gearwheel (5).

8. A device for identifying a gearwheel (5) that induces vibrations in a transmission, the device comprising means for implementing the method of claim 1.

9. A computer program stored on one or more non-transitory computer readable storage mediums (15), the computer program, when executed by one or more processors (13), cause the one or more processors (13) to implement the method of claim 1.

10. The method of claim 1, wherein the group of reference gearwheels (19) includes at least one first gearwheel (19) assigned to the first gearwheel category (23) and at least one second gearwheel (19) assigned to the second gearwheel category (25).

11. A device for identifying a gearwheel (5) that induces vibrations in a transmission, the device comprising:
    a sensor;
    one or more processors (13); and
    one or more non-transitory computer readable storage mediums (15) having stored thereon instructions that, when executed by the one or more processors (13), cause the one or more processors (13) to
        train a generic AI model with a training data set of a group of reference gearwheels (19), at least one reference profile of a surface (21) and a gearwheel category provided for each reference gearwheel (19) of the group, a first gearwheel category (23) of the gearwheel categories assigned to each reference gearwheel (19) of the group that induces a vibration in the transmission that is equal to a vibration threshold or above the vibration threshold, a second gearwheel category (25) of the gearwheel categories assigned to each reference gearwheel (19) that induces a vibration in the transmission that is below the vibration threshold,
        determine a profile of a surface (11) of a gearwheel (5) from the sensor, and
        assign, by the trained AI model, one of the gearwheel categories to the gearwheel (5) based on the determined profile.

12. The device of claim 11, wherein the sensor (7) includes a probe (9), the probe (9) being adjustable such that an end of the probe (9) rides along a path on the surface (11) of the gearwheel (5) and movement of the probe (9) during such adjustment being indicative of the profile of the surface (11).

13. The device of claim 12, further comprising a holding fixture (3), the holding fixture (3) being configured to rotate the gearwheel (5) about an axis of rotation (X) of the gearwheel (5), the probe (9) riding along a first portion (71) of the path on the surface (11) of the gearwheel (5) as the gearwheel (5) is rotated about the axis of rotation (X), the first portion (71) of the path extending perpendicular to the axis of rotation (X).

14. The device of claim 13, wherein a second portion (73) of the path extends parallel to the axis of rotation (X).

15. The device of claim 12, wherein the sensor comprises a scanner (17) for optically detecting the profile of the surface (11).

* * * * *